US008410369B2

(12) United States Patent
Kim et al.

(10) Patent No.: US 8,410,369 B2
(45) Date of Patent: Apr. 2, 2013

(54) BREAKAWAY MECHANISM FOR CHARGING CABLES OF ELECTRIC VEHICLE CHARGING STATIONS

(75) Inventors: Darren Chin-Ho Kim, Oakland, CA (US); Carl F. Hagenmaier, Jr., Los Altos, CA (US); William Sauway Law, New York, NY (US); William Richardson Jones, III, San Francisco, CA (US)

(73) Assignee: Chargepoint, Inc., Campbell, CA (US)

( * ) Notice: Subject to any disclaimer, the term of this patent is extended or adjusted under 35 U.S.C. 154(b) by 0 days.

(21) Appl. No.: 12/882,195

(22) Filed: Sep. 14, 2010

(65) Prior Publication Data

US 2011/0269332 A1 Nov. 3, 2011

Related U.S. Application Data

(60) Provisional application No. 61/363,168, filed on Jul. 9, 2010.

(51) Int. Cl.
*H02G 3/22* (2006.01)

(52) U.S. Cl. ..................... 174/153 G; 439/475; 439/923

(58) Field of Classification Search .................. 439/475, 439/474, 180, 923; 174/153 G, 152 G
See application file for complete search history.

(56) References Cited

U.S. PATENT DOCUMENTS

| | | | |
|---|---|---|---|
| 4,839,937 A * | 6/1989 | Oikawa et al. | 174/153 G |
| 5,344,331 A | 9/1994 | Hoffman et al. | |
| 5,385,480 A | 1/1995 | Hoffman | |
| 5,993,246 A * | 11/1999 | Moldenhauer et al. | 439/474 |
| 6,600,105 B2 * | 7/2003 | Nakata et al. | 174/660 |
| 6,664,470 B2 * | 12/2003 | Nagamoto | 174/652 |
| 6,910,911 B2 * | 6/2005 | Mellott et al. | 439/358 |
| 7,020,931 B1 * | 4/2006 | Burnett et al. | 16/2.2 |
| 7,420,125 B2 * | 9/2008 | Tsukamoto et al. | 174/153 G |
| 7,878,866 B1 * | 2/2011 | Kwasny et al. | 439/695 |
| 2006/0068637 A1 | 3/2006 | Meleck et al. | |

OTHER PUBLICATIONS

PCT International Search Report and Written Opinion for PCT/US2011/043464, mailed Dec. 8, 2011, 9 pages.

* cited by examiner

*Primary Examiner* — Hien Vu
(74) *Attorney, Agent, or Firm* — Blakely, Sokoloff, Taylor & Zafman LLP

(57) ABSTRACT

A breakaway mechanism for a charging cable of an electric vehicle charging station includes a retention component and a breakaway component. The retention component is secured to the charging station and the breakaway component is secured to the charging cable. The charging cable passes through the breakaway component and includes charging wires that connect to connectors on the charging station. The breakaway component is adapted to disengage from the retention component at a predetermined pull force thereby causing the charging wires to disconnect from the connectors on the charging station.

15 Claims, 14 Drawing Sheets

BREAKAWAY MECHANISM FOR CHARGING CABLES OF ELECTRIC VEHICLE CHARGING STATIONS

CROSS-REFERENCE TO RELATED APPLICATIONS

This application claims the benefit of U.S. Provisional Application No. 61/363,168, filed Jul. 9, 2010, which is hereby incorporated by reference.

FIELD

Embodiments of the invention relate to the field of electric vehicle charging stations; and more specifically to a breakaway mechanism for a charging cable of electric vehicle charging stations.

BACKGROUND

Electric vehicle charging stations charge electric vehicles (e.g., electric battery powered vehicles, gasoline/electric battery powered hybrid vehicles, etc.). Energy is provided through a charging cable where one end is connected at the charging station and the other end connects to on-board charging circuitry of an electric vehicle. The charging cable and/or connectors (at the connection point at the charging station and/or at the electric vehicle) are subject to damage in case of unexpected vehicle runaway or other high force that is applied to the charging cable. Certain standards (e.g., NFPA (National Fire Protection Association) 70: National Electrical Code 2008, Article 625, (specifically 625.19 "Automatic De-Energization of Cable"), and UL (Underwriters Laboratories) 2594, Electric Vehicle Supply Equipment, November 2009, (specifically paragraph 13.1.14)) require that the charging cable be de-energized when there is an amount of cable strain that could result in either the charging cable rupturing or separation of the charging cable from the electric vehicle connector and exposure of live parts.

SUMMARY

A breakaway mechanism for a charging cable of an electric vehicle charging station is described. In one embodiment, an electric vehicle charging station ("charging station") includes a set of connectors to connect to a set of one or more charging wires of a charging cable (e.g., power wire(s), signaling wire(s), etc.). A breakaway mechanism includes a retention component that is secured to housing of the charging station and a breakaway component that is secured to the charging cable. The breakaway component is adapted to connect to the retention component and disconnect from the retention component at a predetermined force thereby causing the charging wires to disconnect from the set of connectors.

In one embodiment, the retention component includes a set of finger members that engage with a set of snap members of the breakaway component. The snap members are sized to flex and unsnap from the set of finger members at a predetermined pull force.

In one embodiment, the breakaway component includes an integrated snap and clamp piece that includes the set of snap members and a portion of a clamp to secure the breakaway component to the charging cable. The other portion of the clamp is a separate cable clamp piece that is fastened to the integrated snap and clamp piece by one or more fasteners to secure the breakaway component to the charging cable. The breakaway component may also include a strain relief to constrain the charging cable to a minimum bend radius, In one embodiment the breakaway mechanism works in conjunction with a funnel shaped breakaway enclosure of housing of the charging station. The walls of the funnel shaped enclosure translate the pull force from multiple directions into a one dimensional pull force along the line of axis of the breakaway component. The strain relief also assists in translating the pull force from multiple directions into a one dimensional pull force along the line of axis of the breakaway component. The breakaway component and strain relief (if included) are shaped to allow the detached cable portion and breakaway component to fall unencumbered along the funnel shaped breakaway enclosure so that the wires can easily fall out of the charging station without causing damage to the charging station or wires.

Other embodiments are also described.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and/or techniques have not been shown in detail in order not to obscure the understanding of this description. Those of ordinary skill in the art, with the included descriptions, will be able to implement appropriate functionality without undue experimentation.

References in the specification to “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the term “coupled” along with its derivatives, may be used. “Coupled” is used to indicate that two or more elements, which may or may not be in direct physical or electrical contact with each other, co-operate or interact with each other.

An apparatus for a breakaway mechanism for an electric vehicle charging cable of an electric vehicle charging station is described. In one embodiment, the breakaway mechanism includes a retention component coupled with a breakaway component. The retention component is secured to an electric vehicle charging station (hereinafter “charging station”) and the breakaway component is secured to an electric vehicle charging cable (hereinafter “charging cable”). The charging cable includes a set of charging wires that connect to a set of connectors in the charging station, which are inaccessible by users of the charging station. The breakaway component is adapted to disconnect from retention component when a breakaway force at a predetermined pull force is applied to the breakaway component.

In one embodiment, the retention component includes finger members that slip onto snap members of the breakaway component. The snap members of the breakaway component flex and slip off the finger members of the retention component at a predetermined pull force, causing the charging cable to detach from the charging station (including the set of charging wires disconnecting from the connectors).

In one embodiment, the breakaway mechanism works in conjunction with a funnel shaped enclosure at the charging station. The walls of the funnel shaped enclosure translate the pull force from multiple directions into a one dimensional pull force along the line of axis of the breakaway component.

Figure 1:
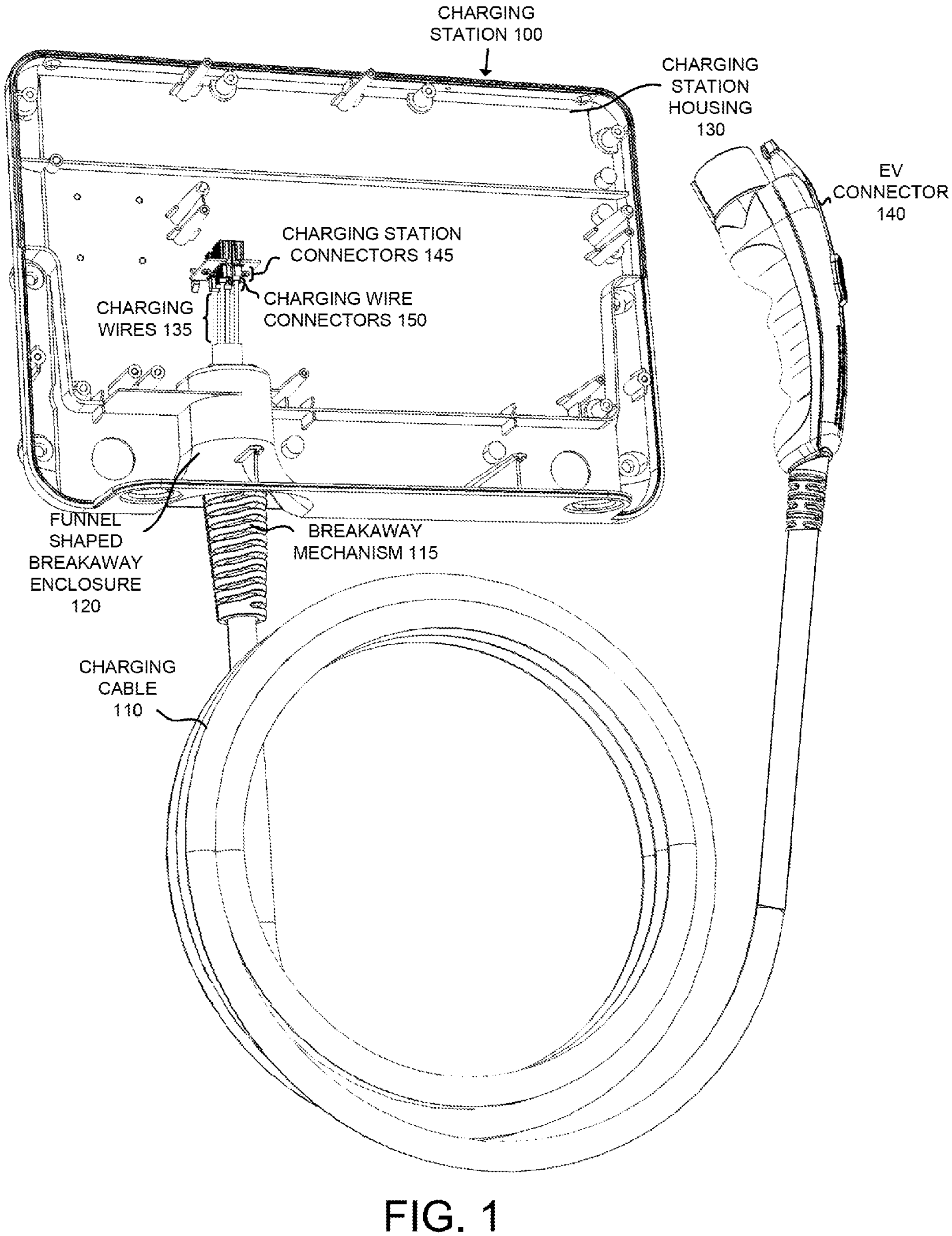
FIG. 1 illustrates an exemplary electric vehicle charging station with an exemplary breakaway mechanism according to one embodiment.

FIG. 1 illustrates an exemplary electric vehicle charging station with an exemplary breakaway mechanism according to one embodiment. The charging station 100 is used to charge electric vehicles (e.g., electric battery powered vehicles, gasoline/electric battery powered hybrid vehicles, etc.). For example, an operator of an electric vehicle connects the electric vehicle connector 140 connected with the charging cable 110 to on-board charging circuitry of their electric vehicle to transfer energy to the electricity storage device of the electric vehicle.

The charging station 100 includes the charging station housing 130 that includes the funnel shaped breakaway enclosure 120. The charging station housing 130 houses the charging station connectors 145. The charging station connectors 145 connect to the charging wire connectors 150 of the charging wires 135 of the charging cable 110 and provide connections to one or more components (not illustrated) (e.g., power, control pilot circuitry, GFCI (ground fault circuit interrupter), etc.) that allow the charging station 100 to transfer energy to electric vehicles. It should be understood that the charging station 100 includes other components that are not directly coupled with the connectors 145 and are not illustrated in order not to obscure understanding of the invention.

The charging cable 110 passes through the breakaway shaped funnel enclosure 120. The charging cable 110 includes the charging wires 135 and terminates at one end with the electric vehicle connector 140, and terminates at the other end with the charging wire connectors 150 (e.g., male connectors) that are capable of being connected to the charging station connectors 145 of the charging station (e.g., female connectors). As illustrated in FIG. 1, the charging wire connectors 150 are connected to the charging station connectors 145. In one embodiment, the charging station connectors 145 are quick disconnect connectors that allow the charging wire connectors 150 to be quickly and easily disconnected (e.g., with a minimal amount of force). For example, upon a breakaway event, the charging wire connectors 150 disconnect from the charging station connectors 145.

In one embodiment, the charging wires 135 include one or more wires for power, a ground wire, and a wire for signaling (e.g., a wire carrying a control pilot signal). In some embodiments, the charging station 100 includes control pilot circuitry (not illustrated) that processes control pilot signals. The control pilot allows charging stations to ensure proper operation when charging electric vehicles. For example, the control pilot can verify that an electric vehicle is connected (e.g., the electric vehicle connector 140 is properly connected to on-board charging circuitry of an electric vehicle) and whether the electric vehicle is ready to accept energy. The charging station 100 further includes an electricity control device to energize and de-energize the charging cable 110. The charging station 100 will de-energize the charging cable 110 or prevent it from being energized when the signal from the control pilot indicates that an electric vehicle is not connected, not ready to accept energy, or there is some other problem. Of course, if the control pilot circuitry does not receive a control pilot signal, the charging station 100 will de-energize the charging cable 110 or prevent it from being energized. Thus, if the charging wire carrying the control pilot signal is disconnected from its charging station connector, the charging cable 110 will not be energized. In such embodiments, the charging wire carrying the control pilot signal may be shorter than the other charging wires so that the charging wire carrying the control pilot signal will be the first charging wire to be disconnected upon a breakaway event causing the charging station 100 to de-energize the charging cable 110.

The charging cable 110 is coupled with the breakaway mechanism 115. The breakaway mechanism 115, which will be described in greater detail later herein, causes the charging cable 110, along with the charging wire connectors 150, to detach from the charging station 100 at a predetermined pull force. For example, the charging wire connectors 150 release from the charging station connectors 145 and the charging cable 110 is allowed to fall through the funnel shaped breakaway enclosure 120. The predetermined pull force is less than what would rupture the charging cable 110 (that is, the breakaway component 220 is designed to separate from the retention component 210 at a force less than would be sufficient to rupture the charging cable 110).

The funnel shaped breakaway enclosure 120 houses at least part of the breakaway mechanism 115 and works in conjunction with the breakaway mechanism to translate pull on the charging cable 110 from multiple directions into a one dimensional pull along the line of axis of the breakaway component of the breakaway mechanism 115. The funnel shaped breakaway enclosure 120 also prevents access to the charging wire connectors 150 and charging station connectors 145 (e.g., a user cannot manually disconnect the charging wire connectors 150). While FIG. 1 illustrates the funnel shaped breakaway enclosure 120 towards the bottom of the charging station housing, embodiments are not so limited as the funnel shaped breakaway enclosure may be in different locations (e.g., extending from the side of the charging station housing 130, extending from the middle of the charging station housing 130, etc.).

Figure 2:
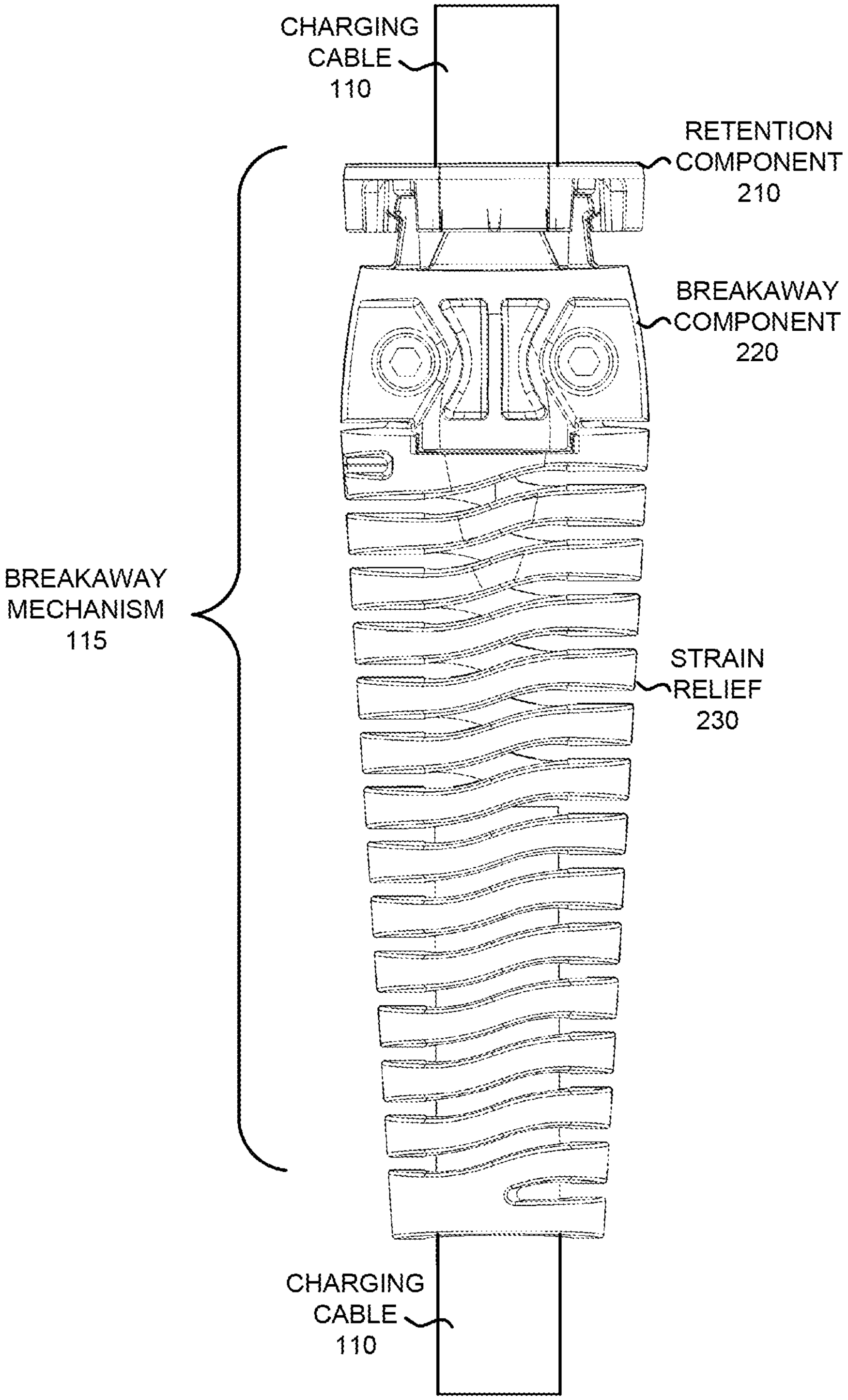
FIG. 2 illustrates the breakaway mechanism of FIG. 1 in more detail according to one embodiment.

FIG. 2 illustrates the breakaway mechanism 115 in more detail according to one embodiment. The breakaway mechanism 115 includes a retention component 210, a breakaway component 220, and the strain relief 230. The retention component 210 is secured to the charging station 100. For example, the retention component 210 is screwed or otherwise fastened to the funnel shaped breakaway enclosure 120. The breakaway component 220 is secured to the charging cable 110 (e.g., is clamped to the charging cable 110) and is coupled with the strain relief 230. The charging cable 110 passes through the breakaway component 220 and the retention component 210. The breakaway component 220 is adapted to break away from the retention component 210 at a predetermined pull force. The retention component 210 typically remains secured to the charging station 100 when the breakaway component 220 disconnects. It should be understood that while the breakaway component 220 is secured to the retention component 210 and the charging cable 110, substantially all of the pull force on the charging cable 110 is applied to the breakaway component 220. Thus, until the breakaway component 220 separates from the retention component 210, the charging wire connectors 150 of the charging wires 135 will typically remain connected to the charging station connectors 145.

The charging cable 110 passes through the strain relief 230 through the breakaway component 220 and the retention component 210. The strain relief 230 constrains the charging cable 110 to a minimum bend radius. This protects the charging cable 110 from damage as well as assisting in translating a pull force from multiple directions into a one dimensional pull force along the axis of the breakaway component 220. The strain relief 230 is secured to the breakaway component 220, as will be described in greater detail with respect to FIG. 3. The strain relief 230 may be different in different embodiments (e.g., a one piece molded polycarbonate strain relief, a linked strain relief (glass filled plastic or aluminum links that attach together), etc.). The breakaway component 220 and strain relief 230 are shaped with gentle, curved profile to not catch or bind to the funnel side walls of the funnel shaped breakaway enclosure 120 during the breakaway disengagement and release from the charging station 100. Thus, after the breakaway disengagement the breakaway component 220 and strain relief 230 fall unencumbered from the charging station 100.

Figure 3:
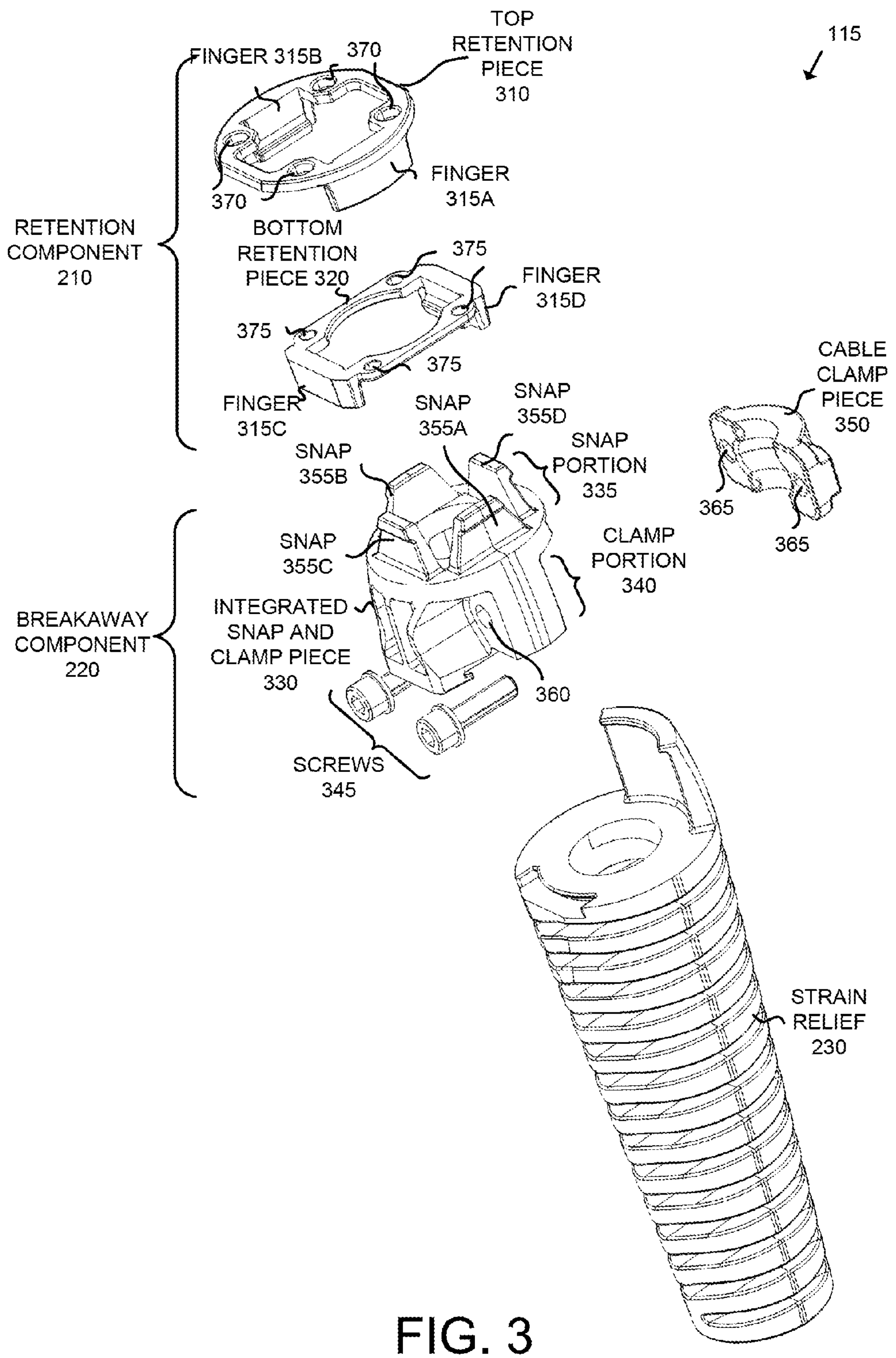
FIG. 3 illustrates an exploded view of the breakaway mechanism of FIG. 1 according to one embodiment.

FIG. 3 illustrates an exploded view of the breakaway mechanism 115 according to one embodiment. The breakaway component 220 includes the integrated snap and clamp piece 330, the cable clamp piece 350, and the screws 345 (which may be socket screws or other screw type and that secure the integrated snap and clamp piece 330 and the cable clamp piece 350 to the charging cable 110). The integrated snap and clamp piece 330 includes a snap portion 335 and a clamp portion 340. The snap portion 335 includes the snap members 355A-D that extend from the top of the integrated snap and clamp piece 330 and are used secure the breakaway component 220 with the retention component 210. Although four snap members are illustrated, in other embodiments the integrated snap and clamp piece includes more snap members or less snap members.

The clamp portion 340, along with the cable clamp piece 350, secures the breakaway component 220 to the charging cable 110 through use of the screws 345. For example, the integrated snap and clamp piece 330 includes the openings 360 and the cable clamp piece 350 includes the threaded openings 365 that allow the screws 345 to fasten the integrated snap and clamp piece 330 and the cable clamp piece 350 together thereby clamping the charging cable 110 to the breakaway component 220. Thus, the integrated snap and clamp piece 330 provides part of the clamp and the cable clamp piece 350 provides the other part of the clamp. While screws are illustrated, in other embodiments a different type of fastener is used to secure the integrated snap and clamp piece 330 and the cable clamp piece 350 to the charging cable 110. Moreover, while two screws are illustrated, in some embodiments there is more or less screws that fasten the integrated snap and clamp piece 330 and the cable clamp piece 350 to the charging cable 110. The strain relief 230 is secured to the breakaway component 220 as the two clamp parts (the integrated snap and clamp piece 330 and the cable clamp piece 350) are fastened together by the screws 345.

Figure 10:
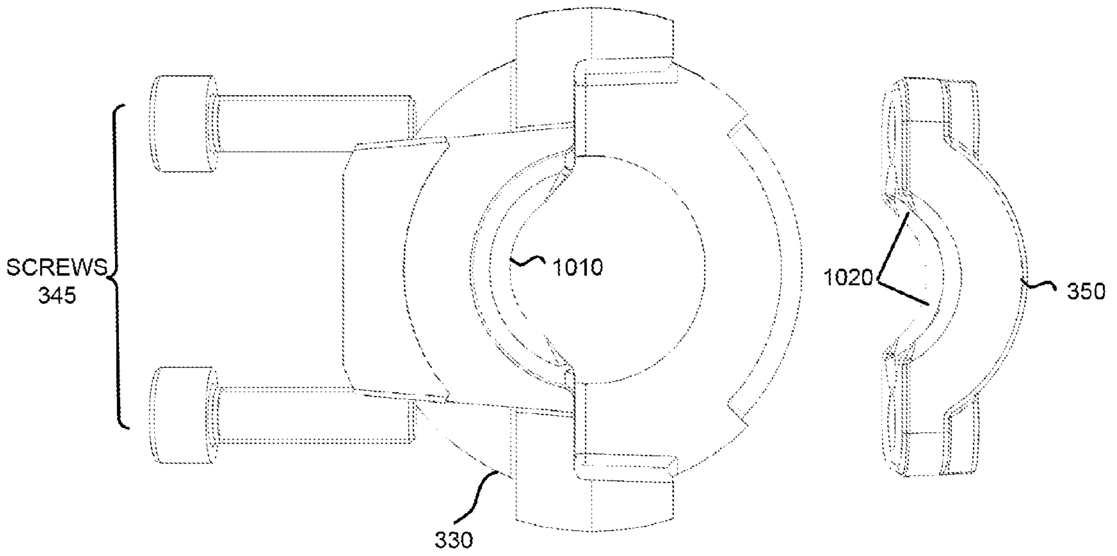
FIG. 10 illustrates a view of the cable clamp portion and the cable clamp piece according to one embodiment.

FIG. 10 illustrates a different view of the cable clamp portion 340 and the cable clamp piece 350. The clamp portion 340 includes the raised surface 1010 and the cable clamp piece includes the surface 1020. The surfaces 1010 and 1020 are textured, knurled, and/or patterned to produce better gripping surfaces for greater cable retention since the cable jacket may be smooth and may slip under large forces. In another embodiment, the filler fibers in the charging cable 110 are peeled back and sandwiched between the cable jacket and the clamp surfaces 1010 and 1020 for greater cable retention.

The retention component 210 includes a top retention piece 310 and a bottom retention piece 320. The top retention piece 310 and bottom retention piece 320 include the fastener openings 370 and 375 (threaded) respectively in order to secure the retention component 210 to the charging station (e.g., screw the retention component 210 into a housing of the charging station). The top retention piece 310 includes the downwardly extending finger members 315A-B at opposite ends and the bottom retention piece 320 includes the downwardly extending finger members 315C-D at opposite ends. When the top retention piece 310 and the bottom retention piece 320 are connected to the breakaway component 220, the finger members 315A-D are substantially 90 degrees apart. In one embodiment, the top retention piece 310 and the bottom retention piece 320 are die cast metal pieces, while in other embodiments the construction material is different (e.g., sheet metal, glass fiber reinforced injection molded plastic, etc.).

Figure 4:
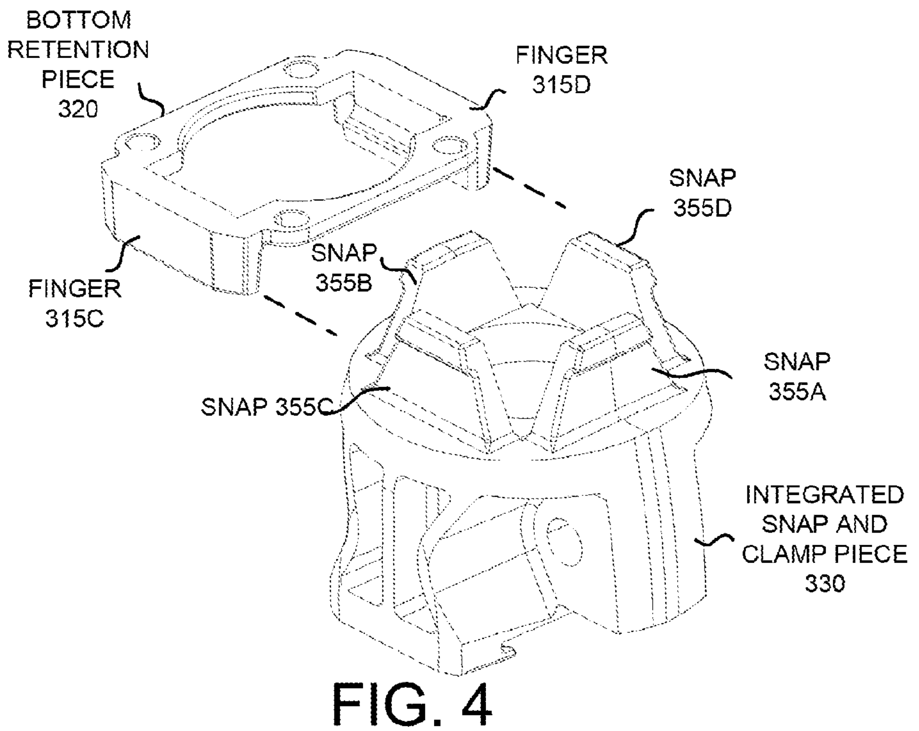
FIG. 4 illustrates a bottom retention piece of a retention component sliding onto an integrated snap and clamp piece of a breakaway component of the breakaway mechanism according to one embodiment.
Figure 5:
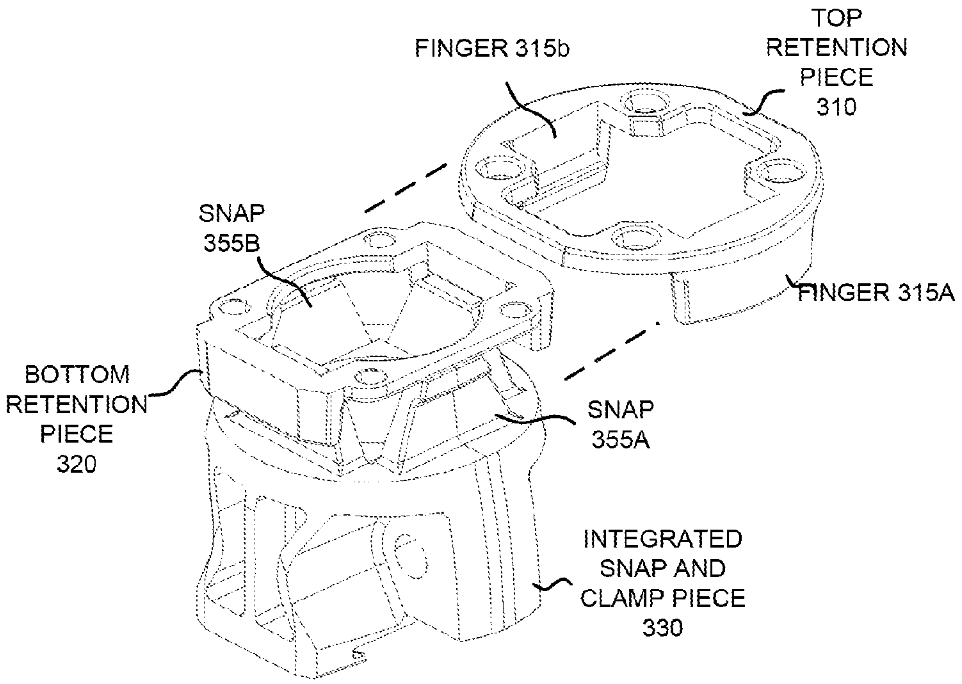
FIG. 5 illustrates a top retention piece of the retention component sliding onto the integrated snap and clamp piece of the breakaway component after the bottom piece retention piece has been slid into position according to one embodiment.

The finger members 315A-D are adapted to be coupled with the snap members 355A-D of the integrated snap and clamp piece 330 respectively to secure the breakaway component 220 to the retention component 210. For example, each of the snap members 355A-D has an outwardly facing portion that is shaped to snap onto an inwardly facing portion of the finger members 315A-D respectively. In one embodiment, the snap members 355A-D have a relatively high deflection force (e.g., 200-300 pounds), which prevents the finger members 315A-D from being easily snapped onto the snap members 355A-D. In such an embodiment, the top retention piece 310 and the bottom retention piece 320 slide onto the breakaway component such that they are nested at a 90 degree orientation over the snap members 355A-D. For example, FIG. 4 illustrates the bottom retention piece 320 sliding onto the integrated snap and clamp piece 330. Specifically, the finger members 315C-D slide in a position to snap to the snap members 355C-D respectively. FIG. 5 illustrates the top retention piece 310 sliding onto the integrated snap and clamp piece 330 after the bottom piece retention piece 320 has been slid into position. Specifically, the finger members 315A-B slide in a position to snap to the snap members 355A-B respectively.

The snap members 355A-D flex and unsnap from the finger members 315A-D at a predetermined pull force, causing the breakaway component 220 (along with the attached charging cable 110) to separate from the retention component 210. For example, the outwardly facing portion of a snap 355 slides down the inwardly facing portion of a finger member 315 until it separates from the finger member 315. When the breakaway component 220 disconnects from the retention component 210, the charging wire connectors 150 will disconnect from the charging station connectors 145 and typically will fall through the opening of the retention component 210. Thus, when the breakaway component 220 disconnects from the retention component 210, the breakaway component 220 disconnects and falls out of the charging station housing 130.

Figure 6:
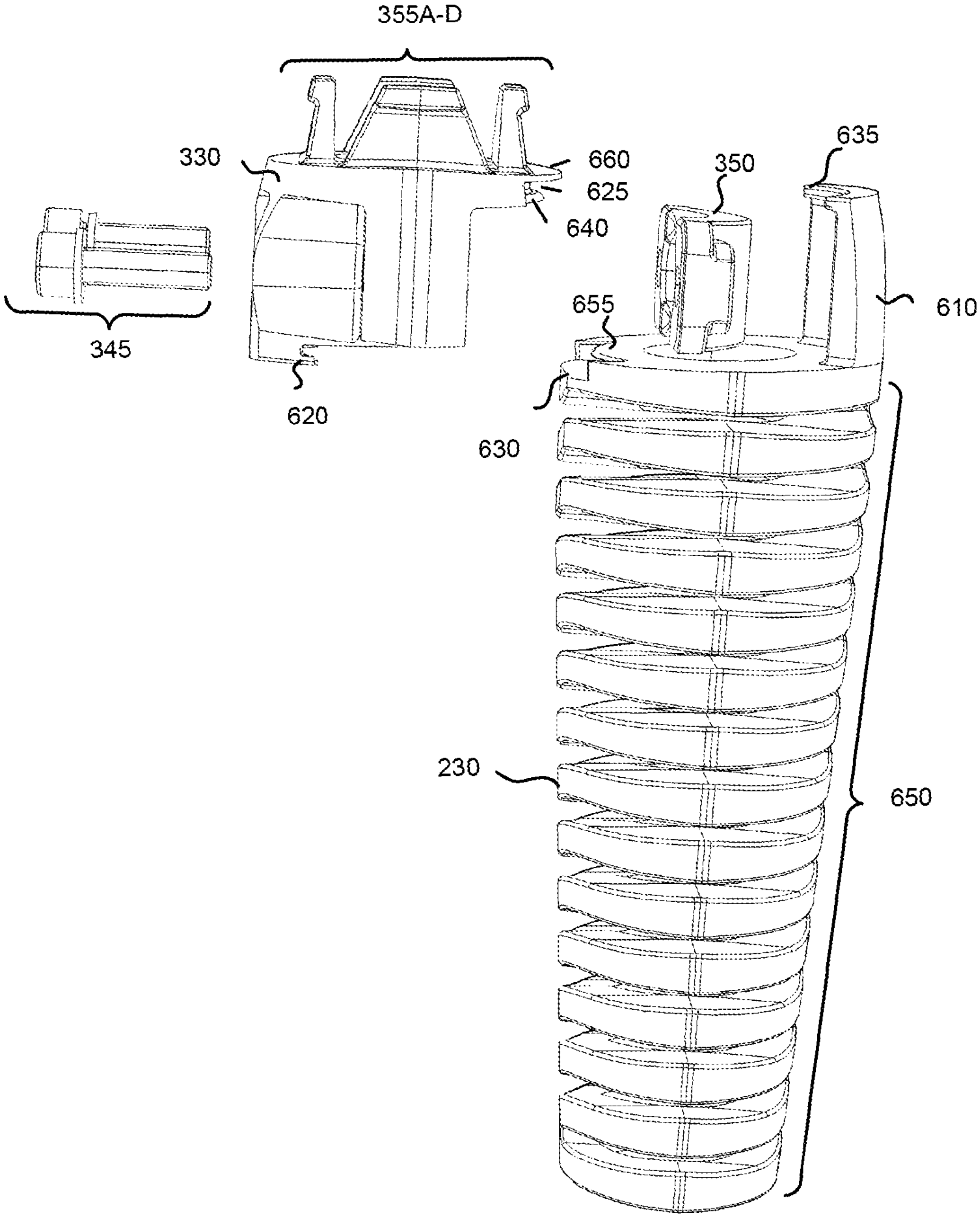
FIG. 6 illustrates an exploded view of the strain relief and the breakaway component of the breakaway mechanism according to one embodiment.

FIG. 6 illustrates an exploded view of the strain relief 230 and the breakaway component 220 in more detail to illustrate the fit of the breakaway component 220 and the strain relief 230 in one embodiment. The strain relief 230 includes the support portion 610 and the cutout portion 630. The integrated snap and clamp piece 330 fits with the strain relief 230 through the support portion 610 and the cutout portion 630. The support portion 610 extends from the body 650 of the strain relief 230 and is curved to allow the curved cable clamp piece 350 to fit against it. The support portion 610 further includes a ridge 635 that fits within the groove 625 between the upper lip 660 and the lower lip 640 of the integrated snap and clamp piece 330. The upper lip 660, which is longer than the lower lip 640, fits over the ridge 635 and the lower lip 640 fits beneath the ridge 635. The cable clamp piece 350 also fits below the ridge 635 and the lip 640. The cutout portion 630 is opposite the support portion 610 and forms the ridge 655. The integrated snap and clamp piece 330 further includes the notch 620 that runs across the bottom of the integrated snap and clamp piece 330. The bottom of the notch 620 fits into the cutout portion 630 and the ridge 655 fits into the opening of the notch 620. It should be understood that fit of the breakaway component 220 with the strain relief 230 is relatively loose until the clamp parts of the breakaway component 220 (the clamp portion 340 and the cable clamp piece 350) are fastened together and clamping the charging cable 110. Thus, the charging cable 110 acts on the strain relief 230 to tightly bind the strain relief 230 to the breakaway component 220 without the use of additional fastener hardware.

Figure 7:
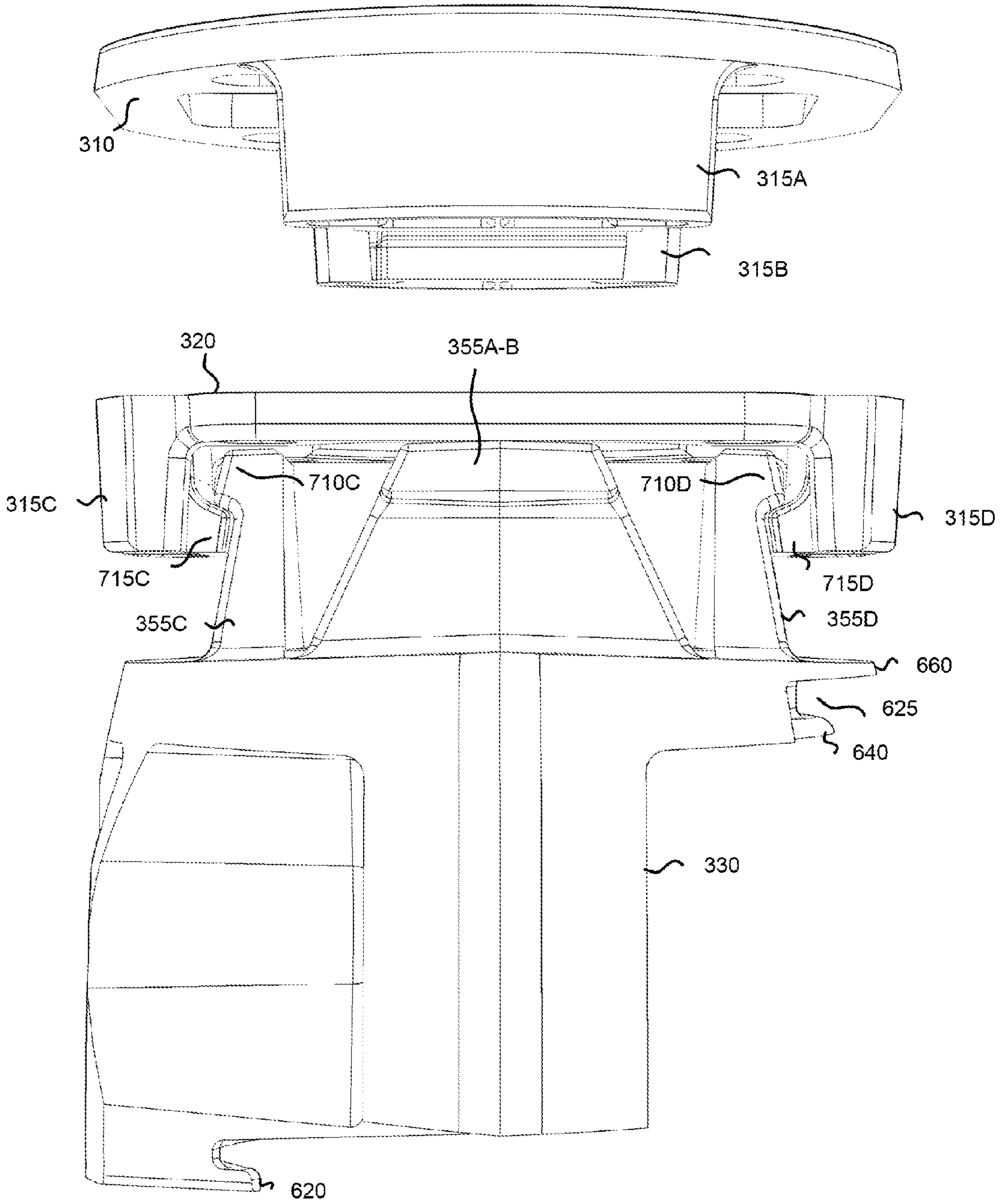
FIG. 7 illustrates the bottom retention piece of the retention component secured to the integrated snap and clamp piece of the breakaway component according to one embodiment.

FIG. 7 illustrates the bottom retention piece 320 secured to the integrated snap and clamp piece 330. Specifically, the finger members 315C-D are slipped onto the snap members 355C-D respectively. The snap member 355C has an outwardly facing portion 710C that snaps with the inwardly facing portion 715C of the finger member 315C and the snap member 355D has an outwardly facing portion 710D that snaps with the inwardly facing portion 715D of the finger member 315D. The snap members 355C-D flex and unsnap from the finger members 315C-D at a predetermined pull force. For example, at a predetermined pull force, the outwardly facing portions 710C-D of the snap members 355C-D slide down the inwardly facing portions 715C-D of the finger members 315C-D until the snap members 355C-D are released from the finger members 315C-D.

Figure 8:
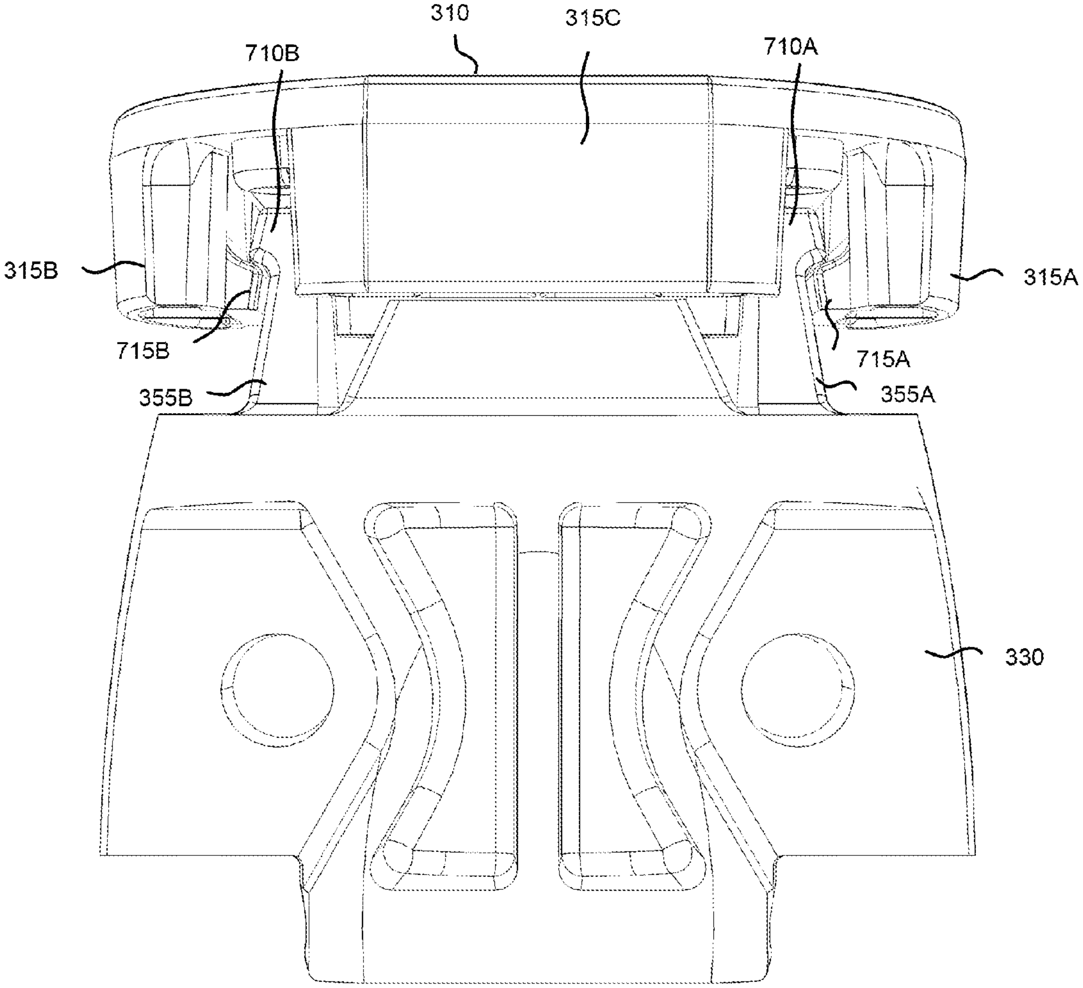
FIG. 8 illustrates the top retention piece and the bottom retention piece of the retention component secured to the integrated snap and clamp piece of the breakaway component according to one embodiment.

FIG. 8 illustrates the top retention piece 310 and the bottom retention piece 320 secured to the integrated snap and clamp piece 330. The snap member 355A has an outwardly facing portion 710A that snaps with the inwardly facing portion 715A of the finger member 315A and the snap member 355B has an outwardly facing portion 710B that snaps with the inwardly facing portion 715B of the finger member 315B. The snap members 355A-B flex and unsnap from the finger members 715A-B at a predetermined pull force. For example, at a predetermined pull force, the outwardly facing portions 710A-B of the snap members 355A-B slide down the inwardly facing portions 715A-B of the finger members 315A-B until the snap members 355A-B are released from the finger members 315A-B.

Figure 9:
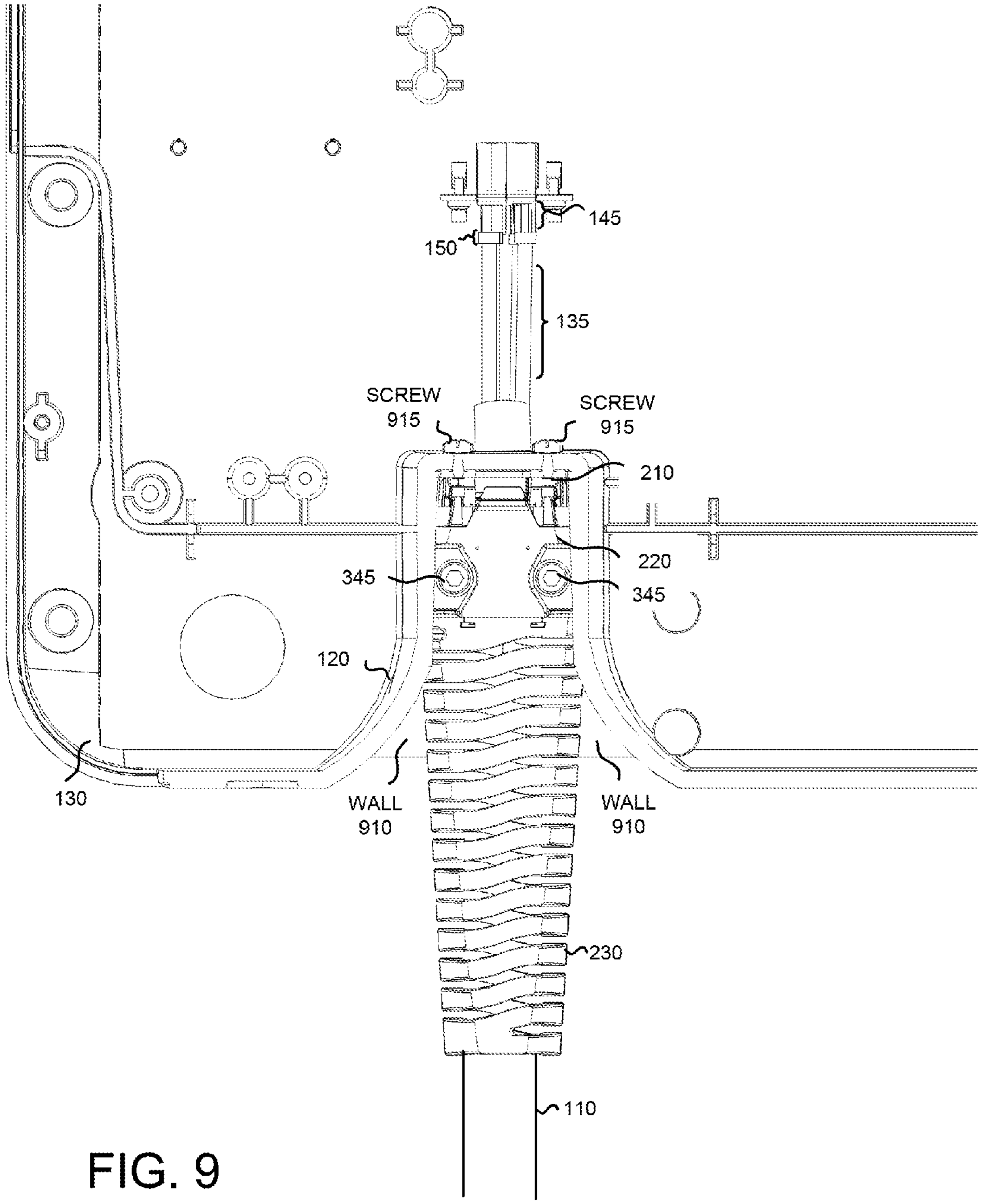
FIG. 9 illustrates a cross section view of the funnel shaped breakaway enclosure of the charging station housing when the charging cable is connected to the charging station according to one embodiment.

FIG. 9 illustrates a cross section view of the funnel shaped breakaway enclosure 120 of the charging station housing 130 when the charging cable 110 is connected to the charging station according to one embodiment. The breakaway component 220 is secured to the funnel shaped breakaway enclosure by the screws 915. The funnel shaped breakaway enclosure 120 translates the pull force to the breakaway component 220 when the charging cable 110 is pulled in a direction that causes the strain relief 230 to press against the inner wall 910 of the funnel shaped breakaway enclosure 120. Thus, regardless of the direction of the pull force (whether substantially on the axis of the breakaway component 220 or from another direction), the force will be applied to the breakaway component 220.

The funnel shaped breakaway enclosure 120 also encloses at least a portion of the breakaway mechanism 115 (e.g., the retention component 210, the breakaway component 220, and at least a portion of the strain relief 230). This prevents access to the charging wire connectors 150 and the charging station connectors 145, as well as the breakaway components. For example, a user cannot reach into the charging station and disconnect the charging wire connectors 150 from the charging station connectors 145. In addition, the funnel shaped breakaway enclosure 120 prevents a user from being able to unscrew the screws 345 that secure the breakaway component 220 to the charging cable 110 or otherwise tamper with the breakaway component 220 or the retention component 210.

After a breakaway event and the charging cable 110 has separated from the charging station 100, a service technician will need to be called to re-connect the charging wire connectors 150 to the charging station connectors 145. The service technician will need to open the charging station in order to access the retention component 210. Typically the service technician will need to unfasten the retention component 210 and secure the breakaway component 220 (e.g., as described with respect to FIGS. 4-5) to the retention component. The service technician then can connect the charging wire connectors 150 to the charging station connectors 145 and secure the retention component 210 to the funnel shaped breakaway enclosure 120. Thus an electric vehicle operator cannot by themselves re-connect the charging wire connectors 150 to the charging station connectors 145.

In some embodiments, after a breakaway event has occurred, the charging station causes a notification message (e.g., an email, a text message) to be transmitted to the owner and/or operator of the charging station 100 that indicates that a breakaway event has occurred (a breakaway notification message). In some embodiments the charging station 100 generates and transmits the breakaway notification message to the owner and/or operator while in other embodiments the charging station 100 transmits a notification message request or a breakaway event indicator message to a separate device (e.g., a remote server coupled to the charging station 100) that generates and transmits the breakaway notification message to the owner and/or operator. Different ways of sensing a breakaway event can be used in different embodiments. For example, in one embodiment, the breakaway component includes a magnet that is sensed by a Hall-effect device that is attached to the retention component. If the breakaway component separates from the retention component, the Hall-effect device changes state. The state change is communicated to a set of one or more control modules of the charging station that cause a breakaway notification message to be transmitted to the owner and/or operator of the charging station.

ALTERNATIVE EMBODIMENTS

Figure 11:
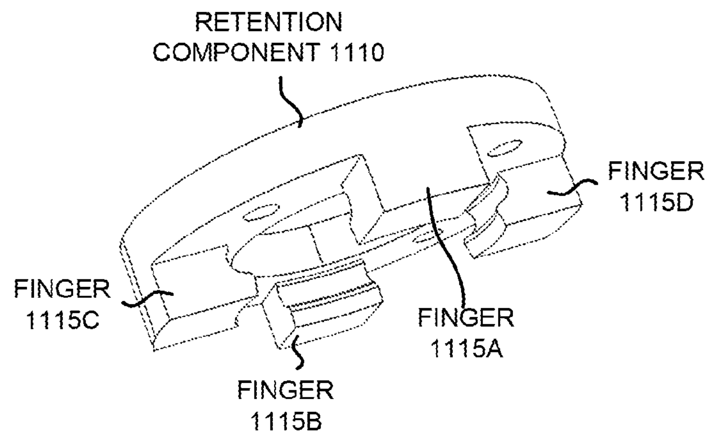
FIG. 11 illustrates an exemplary one piece retention component according to one embodiment.

While embodiments have been described with respect to a two piece retention component (e.g., the top retention 310 and the bottom retention piece 320), in other embodiments there is a single piece retention component. FIG. 11 illustrates an exemplary one piece retention component according to one embodiment. The one piece retention component 1110 includes the finger members 1115A-D. Similar to the two piece retention component 210, in some embodiments the one piece retention component 1110 can secure the integrated snap and clamp piece 330 through the snap members 355A-D respectively. In one embodiment the finger members 1115A-D are lowered between the snap members 355A-D to engagement level and rotated 45 degrees in the same plane so that the fingers rotate and slip onto the snap members 355A-D. In another embodiment, the finger members 1115A-D are snapped onto the snap members 355A-D.

Figure 12:
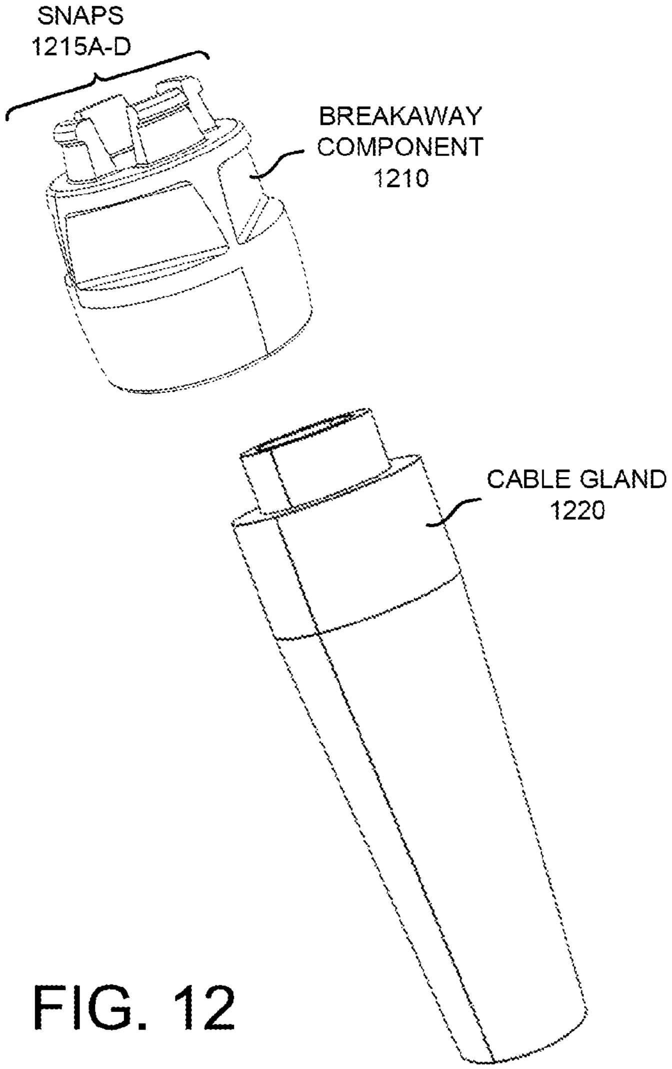
FIG. 12 illustrates an exemplary one piece breakaway component and cable gland according to one embodiment.

While embodiments have been described in relation to a multi-piece breakaway component (e.g., the breakaway component 220), other embodiments use a single piece breakaway component. FIG. 12 illustrates an exemplary one piece breakaway component and cable gland according to one embodiment. The breakaway component 1210 includes the snap members 1215A-D that extend from the top of the one piece breakaway component 1210. The snap members 1215A-D are used to couple the breakaway component 1210 with the finger members of the retention component (e.g., the finger members of the two piece retention component 210 or the one piece retention component 1010) in a similar way as described with the snap members 355A-D of the integrated snap and clamp piece 330.

The single piece breakaway component 1210 is secured to the charging cable 110, however it is secured in a different way than the multi-piece breakaway component 220. For example, instead of clamping the charging cable 110 through use of multiple clamp pieces, the design of the single piece breakaway component 1210 squeezes the charging cable 110 through use of the cable gland 1220. Thus, the charging cable 110 passes through the cable gland 1220, which itself fits within the breakaway component 1210, and the breakaway component 1210.

Figure 13:
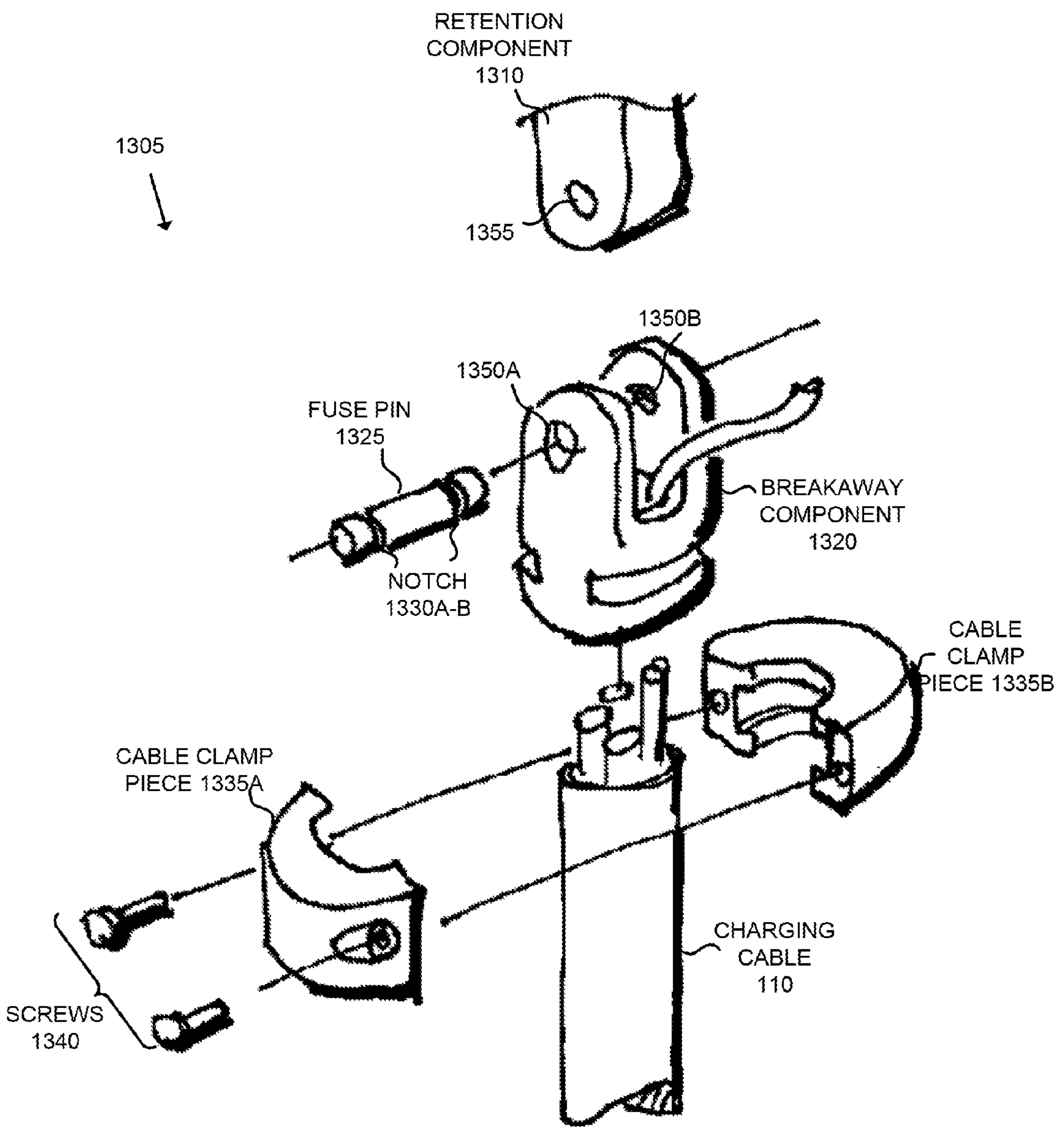
FIG. 13 illustrates a breakaway mechanism that uses a fuse pin disengagement mechanism according to one embodiment.

While embodiments have been described in relation to using a finger and snap disengagement mechanism, other embodiments use different disengagement mechanisms. FIG. 13 illustrates a breakaway mechanism that uses a fuse pin disengagement mechanism according to one embodiment. The breakaway mechanism 1305 includes the retention component 1310, the breakaway component 1320, and the cable clamp pieces 1335A-B. In one embodiment, the retention component 1310 is secured to the charging station housing. The breakaway component 1320 is secured to the charging cable 110 as the cable clamp pieces 1335A-B are fastened by the screws 1340. Although not illustrated, a strain relief similar to the strain relief 230 may be also be used in some embodiments.

The breakaway component 1320 is secured to the retention component 1310 by the fuse pin 1325. The fuse pin 1325 is a double notch fuse pin that passes through one of the openings 1350A-B of the breakaway component 1320 and the opening 1355 of the retention component 1310 and then through the other one of the openings 1350A-B such that the notches 1330A-B rest on the breakaway component 1320 and the pin 1325 secures the breakaway component 1320 to the retention component 1310. The charging wires of the charging cable 110 pass through the breakaway component 1320, but may not pass through the retention component 1310. Upon a predetermined pull force, the fuse pin 1325 breaks in double shear causing the breakaway component 1320 to separate from the retention component 1310 (the retention component 1310 typically remains secured to the charging station), thereby causing the charging wire connectors 150 to disconnect from the charging station connectors 145. Although not illustrated, in some embodiments the breakaway mechanism 1305 can be used in conjunction with the funnel shaped breakaway enclosure 120.

Figure 14:
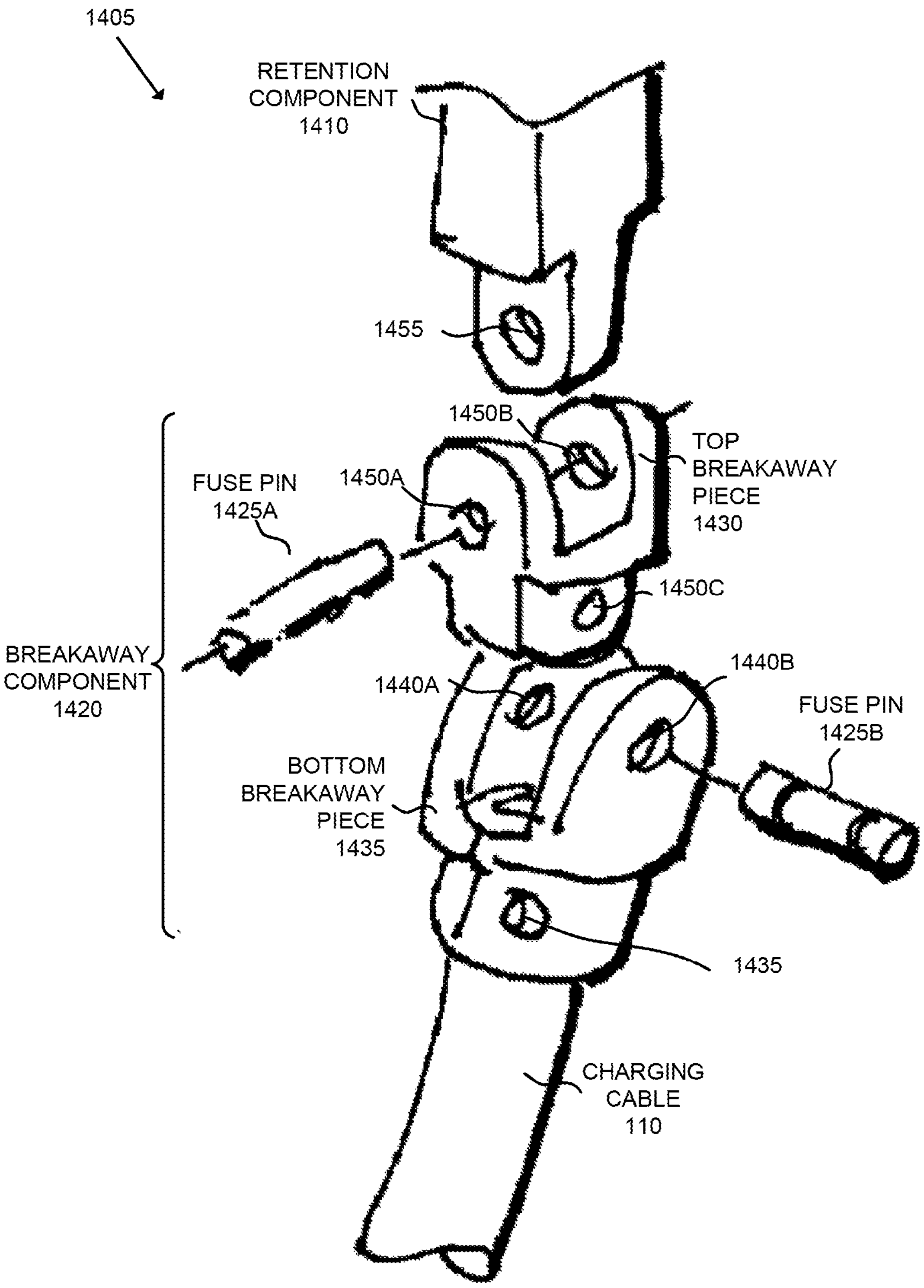
FIG. 14 illustrates a breakaway mechanism that uses an alternative fuse pin disengagement mechanism according to one embodiment.

FIG. 14 illustrates a breakaway mechanism that uses an alternative fuse pin disengagement mechanism according to one embodiment. In contrast to the fuse pin disengagement mechanism 1305 illustrated in FIG. 13 that has one degree of freedom, the disengagement mechanism 1405 has two degrees of freedom. The breakaway mechanism 1405 includes the retention component 1410, which is similar to the retention component 1310, and the breakaway component 1420. In one embodiment, the retention component 1410 is secured to the charging station.

The breakaway component includes the top breakaway piece 1430 and the bottom breakaway piece 1435. The bottom breakaway piece 1435 is secured to the charging cable 110 (e.g., through a cable clamping mechanism such as illustrated in FIG. 13) and connects to the top breakaway piece 1430 which itself connects to the retention component 1410. The connection between the top breakaway piece 1430 and the retention component 1410, and the connection between the bottom breakaway piece 1435 and the top breakaway piece 1430 are substantially perpendicular. Accordingly, the top breakaway piece 1430 provides one degree of freedom and the bottom breakaway piece 1435 provides another degree of freedom. The breakaway mechanism illustrated in FIG. 14 is more tolerant to multiple directions of pull force than the breakaway mechanism illustrated in FIG. 13.

The fuse pin 1425A is a double notch fuse pin that secures the top breakaway piece 1430 to the retention component 1410. For example, the fuse pin 1425A passes through one of the openings 1450-B of the top breakaway piece and through the opening 1455 of the retention component 1410 and then through the other one of the openings 1450A-B such that the pin notches rest on the top breakaway piece 1430 and secures the top breakaway piece 1430 to the retention component 1410. The opening 1450C that is used when securing the bottom breakaway piece 1435 to the top breakaway piece 1430 is substantially perpendicular to the openings 1450A-B.

The fuse pin 1425B is a double notch fuse pin that secures the bottom breakaway piece 1435 to the top breakaway piece 1430. The fuse pin 1425B passes through one of the openings 1440A-B of the bottom breakaway piece 1435 and the opening 1450C of the top breakaway piece 1430 such that the pin notches rest on the bottom breakaway piece 1435 and secures the bottom breakaway piece 1435 to the top breakaway piece 1430. The opening 1435 of the bottom breakaway piece 1435 is used to fasten the bottom breakaway piece 1435 to the charging cable 110 (e.g., tighten a screw or other fastener in the opening 1435 to secure the bottom breakaway piece 1435 to the charging cable 110).

While FIG. 14 illustrates that the top breakaway piece 1430 is secured to the retention component 1410 with the fuse pin 1425A and the bottom breakaway piece 1435 is secured to the top breakaway piece with the fuse pin 1425B, in other embodiments only one of the breakaway pieces are secured using a fuse pin. For example, the top breakaway piece 1430 may be secured to the retention component 1410 with a fuse pin while the bottom breakaway piece 1435 may be secured to the top breakaway piece 1430 using standard hinge pin that allows pivoting, but does not have breakaway capability; or the bottom breakaway piece 1435 is secured to the top breakaway piece 1430 with a fuse pin while the top breakaway piece 1430 is secured to the retention component 1410 using a standard hinge pin that allows pivoting but does not have breakaway capability.

Figure 15:
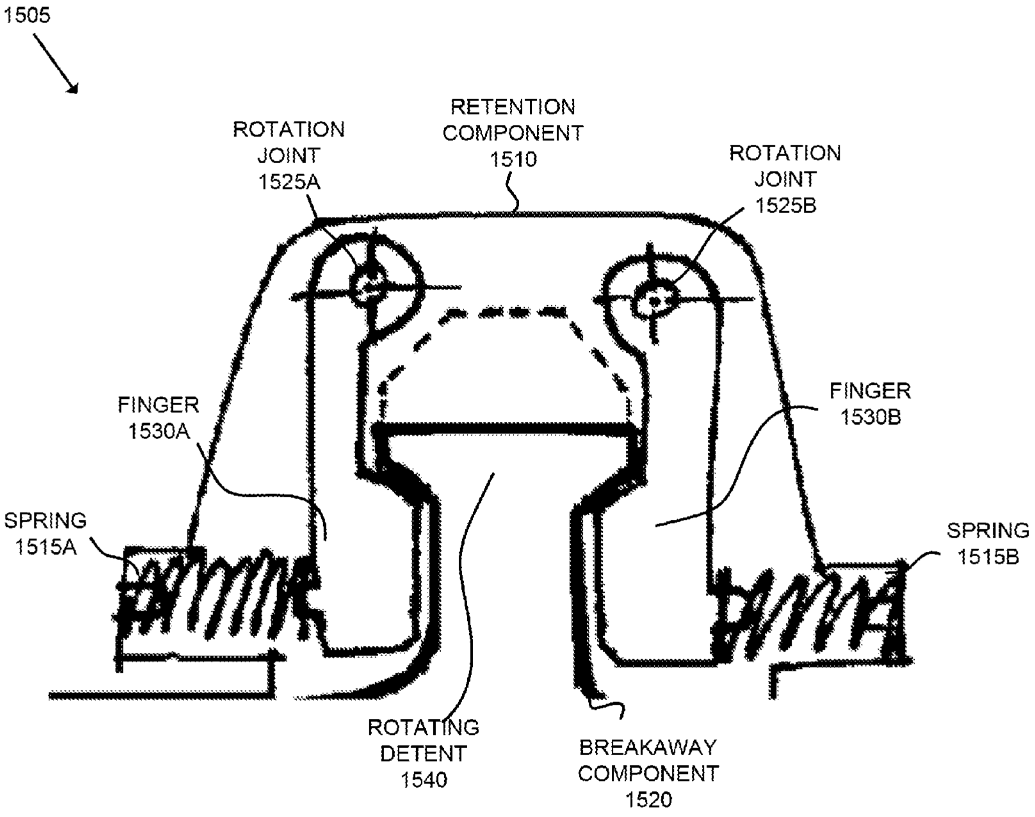
FIG. 15 illustrates a breakaway mechanism that uses a rotating detent disengagement mechanism according to one embodiment.

FIG. 15 illustrates a breakaway mechanism that uses a rotating detent disengagement mechanism according to one embodiment. The breakaway mechanism 1505 includes the retention component 1510 and the breakaway component 1520. The retention component 1510 is secured to the charging station (e.g., the funnel shaped breakaway enclosure 120). The retention component 1510 includes the finger members 1530A-B that are loaded by the compression springs 1515A-B. The finger members 1530A-B can be rotated through use of the rotation joints 1525A-B. The finger members 1530A-B secure the rotating detent 1540 of the breakaway component 1520. At a predetermined pull force, the force on the rotating detent 1540 causes the compression springs 1515A-B to deflect to such an amount to cause the finger members 1530A-B to release the rotating detent 1540 causing the breakaway component 1520 to separate from the retention component 1510. Although not illustrated, the breakaway component 1520 is secured to the charging cable (e.g., the breakaway component 1520 includes a two piece clamp similar to the cable clamp pieces 1335A-B). Although not illustrated, a strain relief similar to the strain relief 230 may be also be used in the breakaway mechanism 1505 and/or a funnel shaped breakaway enclosure (e.g., the funnel shaped breakaway enclosure 120) may be used in conjunction with the breakaway mechanism 1505.

Figure 16:
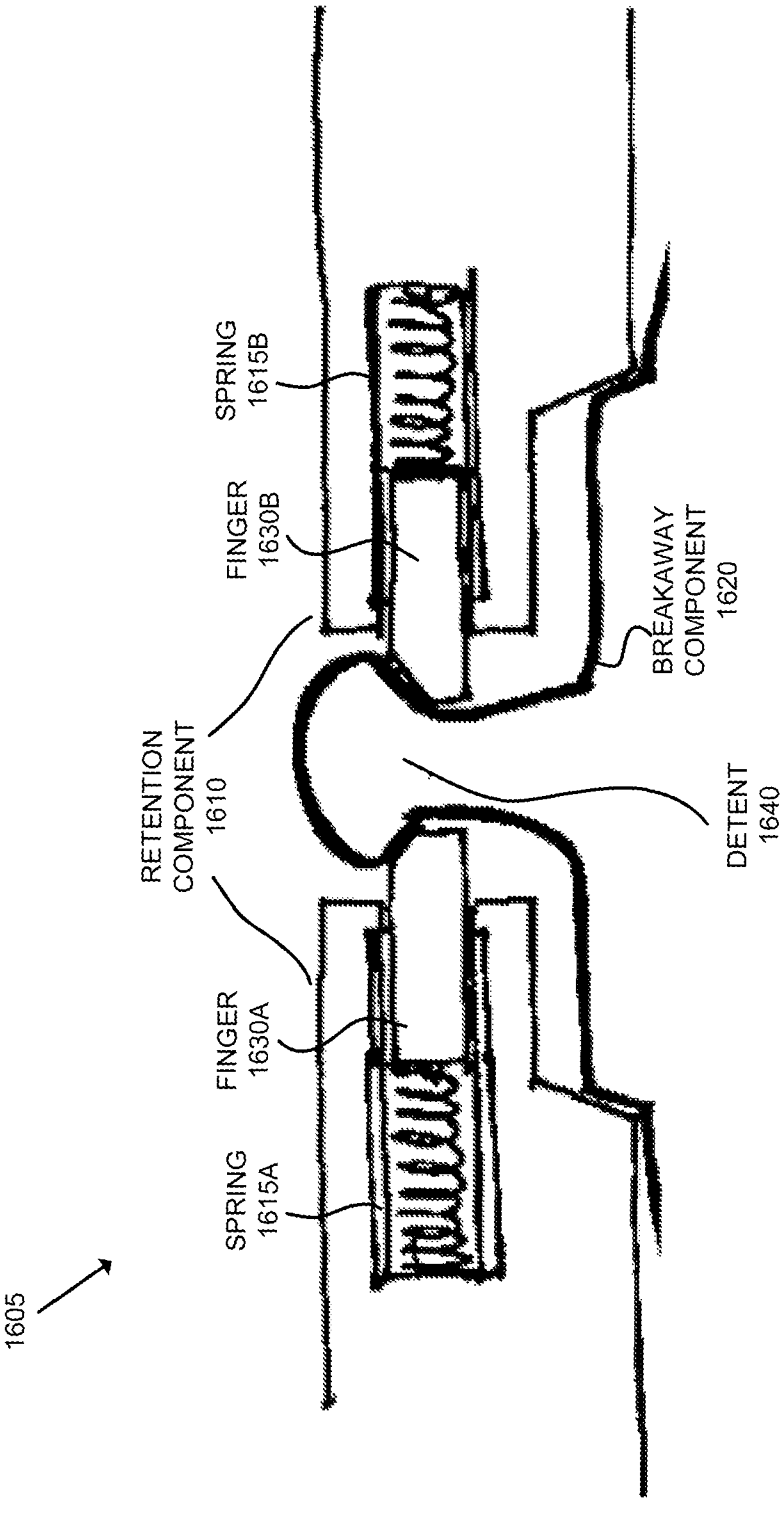
FIG. 16 illustrates a breakaway mechanism that uses a sliding detent disengagement mechanism according to one embodiment.

FIG. 16 illustrates a breakaway mechanism that uses a sliding detent disengagement mechanism according to one embodiment. The breakaway mechanism 1605 includes the retention component 1610 and the breakaway component 1620. The retention component 1610 is secured to the charging station (e.g., the funnel shaped breakaway enclosure 120). The retention component 1610 includes the finger members 1630A-B that are loaded by the compression springs 1615A-B respectively. The finger members 1630A-B secure the detent 1640 of the breakaway component 1620. At a predetermined pull force, the force on the rotating detent 1640 causes the compression springs 1615A-B to deflect to such an amount to cause the finger members 1630A-B to release the detent 1640 causing the breakaway component 1620 to separate from the retention component 1610. Although not illustrated, the breakaway component 1620 is secured to the charging cable (e.g., the breakaway component 1620 includes a two piece clamp similar to the cable clamp pieces 1335A-B). Although not illustrated, a strain relief similar to the strain relief 230 may be also be used in the breakaway mechanism 1605 and/or a funnel shaped breakaway enclosure (e.g., the funnel shaped breakaway enclosure 120) may be used in conjunction with the breakaway mechanism 1605.

While several different disengagement mechanisms have been described, other types of disengagement mechanisms may be used in other embodiments (e.g., magnets, non-permanent adhesives, latches, breakaway plates, etc).

While embodiments of the invention have been described with respect to clamping the breakaway component to the charging cable, in alternative embodiments the breakaway component is attached to the charging cable differently (e.g., magnets, adhesives, etc.).

While embodiments of the invention have been described with respect to a breakaway mechanism located near the charging station connectors, in alternative embodiments the breakaway mechanism is located in different locations (e.g., the body of the charging cable, the electric vehicle connector). For example, in some embodiments a breakaway mechanism is substantially near or integrated with the electric vehicle connector such as the connector 140. In such a breakaway mechanism, the retention component may be secured within the electric vehicle connector and the breakaway component is secured to the charging cable. Different disengagement mechanisms may be used in different embodiments. For example, a fuse pin disengagement mechanism may be used where the retention component and the breakaway component are connected through a fuse pin that is adapted to break at a predetermined force. When a predetermined force is applied, the breakaway component separates from the retention component thereby separating the charging cable from the electric vehicle connector. In embodiments where the charging station processes control pilot signals, the wire carrying the control pilot signal may be shorter than the other wires (e.g., the wires carrying the power) such that the control pilot signal is the first signal to be interrupted thereby causing the charging station to de-energize the charging cable.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A breakaway mechanism for an electric vehicle charging station, comprising:

a retention component to be secured to the electric vehicle charging station, wherein the retention component includes a set of one or more finger members; and a breakaway component that includes a set of one or more snap members to engage with the set of finger members to connect the breakaway component to the retention component, the breakaway component further to be secured to a charging cable that passes through the breakaway component and that includes a set of one or more charging wires that connect to a set of one or more electric vehicle charging station connectors, wherein the set of snap members of the breakaway component disengages from the set of finger members of the retention component at a predetermined pull force to cause the breakaway component to disengage from the retention component and to cause the set of charging wires to disconnect from the set of electric vehicle charging station connectors.

2. The breakaway mechanism of claim 1, wherein the breakaway component includes a cable clamp piece and an integrated snap and clamp piece that includes the set of snap members, the cable clamp piece and the integrated snap and clamp piece to secure the breakaway component to the charging cable.

3. The breakaway mechanism of claim 1, wherein the retention component includes a first retention piece that includes a first set of one or more of the set of finger members and a second retention piece that includes a second set of one or more of the set of finger members.

4. The breakaway mechanism of claim 3, wherein the first retention piece is to slide into position such that the first set of finger members engage with a first set of one or more of the set of snap members, and wherein the second retention piece is to slide into position such that the second set of finger members engage with a second set of one or more of the set of snap members.

5. The breakaway mechanism of claim 1, wherein the set of charging wires includes a wire carrying a pilot control signal that the electric vehicle charging station uses to ensure proper charging operation, and a set of one or more power wires, wherein the wire carrying the pilot control signal is shorter than the set of power wires such that the wire carrying the pilot control signal is disconnected first when the breakaway component disengages from the retention component.

6. The breakaway mechanism of claim 1, further comprising:

a strain relief to be coupled with the breakaway component and to constrain the charging cable to a minimum bend radius.

7. The breakaway mechanism of claim 6, wherein the breakaway mechanism is to be at least partially enclosed within a funnel shaped breakaway enclosure of the electric vehicle charging station that translates pull force when the charging cable is pulled in a direction that causes the strain relief to press against an inner wall of the funnel shaped breakaway enclosure to a one dimensional pull force along the line of axis of the breakaway component.

8. An apparatus, comprising:

an electric vehicle charging station including:

a set of one or more connectors to connect to a set of one or more charging wires of a charging cable; and a breakaway mechanism including:

a retention component that is secured to housing of the electric vehicle charging station, the retention component including a set of one or more finger members, and a breakaway component that is connected to the retention component and is secured to the charging cable, the breakaway component including:

a set of one or more snap members that engage with the set of finger members to connect the breakaway component to the retention component and disengage from the set of finger members at a predetermined pull force to disconnect the breakaway component from the retention component causing the set of charging wires to disconnect from the set of connectors, and a set of one or more clamping pieces that secures the breakaway component to the charging cable, and wherein the set of snap members and at least one of the set of clamping pieces are integrated in a single integrated snap and clamp piece.

9. The apparatus of claim 8, wherein the integrated snap and clamp piece provides a portion of a clamp, wherein the breakaway component further includes a cable clamp piece that provides the remaining portion of the clamp, the integrated snap and clamp piece and the cable clamp piece to secure the breakaway component to the charging cable when fastened together by one or more fasteners.

10. The apparatus of claim 9, wherein the breakaway mechanism further includes a strain relief that is secured to the breakaway component when the integrated snap and clamp piece and the cable clamp piece are fastened together by the one or more fasteners, the strain relief to constrain the charging cable to a minimum bend radius.

11. The apparatus of claim 10, wherein the strain relief includes a support portion that extends from the body of the strain relief and is curved to allow the cable clamp piece to fit against the support portion.

12. The apparatus of claim 10, wherein the electric vehicle charging station further includes a housing that includes a funnel shaped breakaway enclosure that encloses at least a portion of the breakaway mechanism including the breakaway component, wherein the retention component is secured to the funnel shaped breakaway enclosure, and wherein the funnel shaped breakaway enclosure translates pull force when the charging cable is pulled in a direction that causes the strain relief to press against an inner wall of the funnel shaped breakaway force to a one dimensional pull force along the line of axis of the breakaway component.

13. The apparatus of claim 8, wherein the retention component includes a top retention piece and a bottom retention piece that each include one or more of the set of finger members, wherein the top retention piece and bottom retention piece each slide on the breakaway component and secure different ones of the set of snap members.

14. The apparatus of claim 8, wherein the set of charging wires includes a wire carrying a pilot control signal that the electric vehicle charging station uses to ensure proper charging operation, and a set of one or more power wires, and wherein the wire carrying the pilot control signal is shorter than the set of power wires such that the wire carrying the pilot control signal is disconnected first when the breakaway component disengages from the retention component.

15. A breakaway mechanism for an electric vehicle charging station, comprising:

a retention component;

a breakaway component;

a means for securing the retention component to the electric vehicle charging station;

a means for securing the breakaway component to a charging cable that is connected to the electric vehicle charging station;

a means for providing strain relief for the charging cable;

a means for translating pull force in multiple directions into a one dimensional pull force along the line of axis of the breakaway component; and a means for disengaging the breakaway component from the retention component at a predetermined pull force to cause the charging cable to disconnect from the electric vehicle charging station.

* * * * *